US009407343B2

(12) United States Patent
Krishnamurthy

(10) Patent No.: US 9,407,343 B2
(45) Date of Patent: Aug. 2, 2016

(54) METHOD AND APPARATUS FOR MITIGATING DOWNLINK INTERFERENCE

(75) Inventor: Sandeep H. Krishnamurthy, Mountain View, CA (US)

(73) Assignee: Google Technology Holdings LLC, Mountain View, CA (US)

(*) Notice: Subject to any disclaimer, the term of this patent is extended or adjusted under 35 U.S.C. 154(b) by 0 days.

(21) Appl. No.: 13/600,667

(22) Filed: Aug. 31, 2012

(65) Prior Publication Data

US 2014/0064109 A1    Mar. 6, 2014

(51) Int. Cl.
*H04W 24/10* (2009.01)
*H04B 7/04* (2006.01)
(Continued)

(52) U.S. Cl.
CPC .......... *H04B 7/0456* (2013.01); *H04J 11/0053* (2013.01); *H04B 7/065* (2013.01);
(Continued)

(58) Field of Classification Search
CPC ... H04L 5/0057; H04L 5/0048; H04L 5/0053; H04L 5/0023; H04L 1/0026; H04L 2025/03426; H04L 25/03343; H04L 1/0003; H04L 1/0009; H04L 1/0031; H04L 25/0204; H04L 5/0035; H04L 5/0073; H04L 1/1671; H04L 25/03898; H04W 72/042; H04W 72/085; H04W 24/10; H04W 24/00; H04W 24/08; H04W 72/12; H04W 72/02; H04W 48/00; H04W 52/42; H04J 11/0023; H04J 11/0033; H04B 7/0639; H04B 7/0486; H04B 7/0632; H04B 7/0478; H04B 7/0619; H04B 7/0626; H04B 7/063; H04B 7/0413; H04B 7/0452–7/0456

USPC ............ 455/450, 422.1, 115.1; 370/329, 252, 370/328, 491, 208, 210, 310, 203; 375/267, 375/285, 346, 316, 260, 296
See application file for complete search history.

(56) References Cited

U.S. PATENT DOCUMENTS

2011/0032839 A1* 2/2011 Chen ...................... H04B 7/024
370/252
2011/0080961 A1* 4/2011 Hui et al. ...................... 375/259
(Continued)

FOREIGN PATENT DOCUMENTS

WO    2009084921 A2    7/2009
WO    2011013887 A1    2/2011
(Continued)

OTHER PUBLICATIONS

Patent Cooperation Treaty, International Search Report and Written Opinion of the International Searching Authority for International Application No. PCT/US2013/056969, Feb. 5, 2014, 12 pages.
(Continued)

*Primary Examiner* — Charles C Jiang
*Assistant Examiner* — Rose Clark
(74) *Attorney, Agent, or Firm* — Faegre Baker Daniels LLP

(57) ABSTRACT

A wireless device transmits downlink interference-related information to a transmission point. The wireless device generates this information by listening to reference signals associated with a first reference signal resource as well as with a second reference signal resource. The wireless device uses these reference signals to estimate a first channel matrix relating to the first reference signal resource and a second channel matrix relating to the second reference signal resource. Using the estimated first and second channel matrices, the wireless device derives a pair of precoding matrices. Precoding matrix indicators representing the precoding matrix pair are sent to the transmission point.

33 Claims, 6 Drawing Sheets

(51) Int. Cl.
*H04J 11/00* (2006.01)
*H04W 72/00* (2009.01)
*H04L 1/00* (2006.01)
*H04L 5/00* (2006.01)
*H04B 7/06* (2006.01)

(52) U.S. Cl.
CPC ............ *H04L 1/0031* (2013.01); *H04L 5/0035* (2013.01); *H04L 5/0048* (2013.01); *H04L 5/0053* (2013.01); *H04W 72/00* (2013.01)

(56) References Cited

U.S. PATENT DOCUMENTS

| | | | |
|---|---|---|---|
| 2011/0080965 A1* | 4/2011 | Liu et al. | 375/260 |
| 2011/0081901 A1* | 4/2011 | Moulsley | H04B 7/024 455/422.1 |
| 2011/0122968 A1* | 5/2011 | Jongren et al. | 375/296 |
| 2011/0170427 A1* | 7/2011 | Koivisto et al. | 370/252 |
| 2011/0243019 A1* | 10/2011 | Prasad et al. | 370/252 |
| 2011/0244847 A1* | 10/2011 | Mallik et al. | 455/422.1 |
| 2012/0020433 A1* | 1/2012 | Bhattad et al. | 375/296 |
| 2012/0021738 A1 | 1/2012 | Koo et al. | |
| 2012/0076033 A1* | 3/2012 | Mundarath et al. | 370/252 |
| 2012/0087332 A1* | 4/2012 | Kim | H04B 7/063 370/329 |
| 2012/0114028 A1* | 5/2012 | Davydov | H04B 7/024 375/224 |
| 2012/0289281 A1* | 11/2012 | Zhu | 455/525 |
| 2013/0094604 A1* | 4/2013 | Mondal et al. | 375/295 |
| 2013/0242896 A1* | 9/2013 | Son et al. | 370/329 |
| 2013/0301746 A1* | 11/2013 | Mobasher et al. | 375/267 |
| 2013/0308715 A1* | 11/2013 | Nam et al. | 375/267 |
| 2014/0044061 A1* | 2/2014 | Yue et al. | 370/329 |

FOREIGN PATENT DOCUMENTS

WO 2012102479 A2 8/2012
WO 2012108573 A1 8/2012

OTHER PUBLICATIONS

Tiangao Gou, Syed A. Jafar, Degrees of Freedom of the K User MxN MIMO Interference Channel, IEEE Transactions on Information Theory, Dec. 2010, vol. 56, Issue: 12, pp. 6040-6057.

Changho Suh, Minnie Ho, D. Tse, "Downlink Interference Alignment", submitted to the IEEE Transactions on Communications, Mar. 2010, all pages.

3GPP TSG RAN WG1 #66, R1-112339 "CoMP Performance Evaluation under Lo-Capacity/High-Latency Backhaul" LG Electronics; Athens, Greece; Aug. 22-26, 2011; 5 pages.

3GPP TSG RAN WG3 #55bis, R3-070593 "X2 Interface Delay" Motorola; St. Julian's, Malta; Mar. 27-30, 2007; 3 pages.

* cited by examiner

Scenario 1 - Homogeneous network with intra-site CoMP

Scenario 2 - Homogeneous network with high Tx power RRHs

Scenario 3/4 - Network with low power RRHs within the macrocell coverage

METHOD AND APPARATUS FOR MITIGATING DOWNLINK INTERFERENCE

TECHNICAL FIELD

The present application relates generally to wireless communication, and more particularly, to mitigating downlink interference in a wireless communication system.

BACKGROUND

In certain cellular networks, there may be a large disparity between the average cell data throughput. For example, it has been observed that certain Long Term Evolution (LTE) networks experience a 10:1 ratio between cell-average throughput and cell-edge throughput. Such a disparity may result in different users experiencing significant differences in the difference in Quality of Service (QoS).

BRIEF DESCRIPTION OF THE DRAWINGS

In accordance with the foregoing, a method and apparatus for mitigating downlink interference will now be described. The various aspects, features and advantages of the invention will become more fully apparent in the following description with the accompanying drawings described below. The drawings may have been simplified for clarity and are not necessarily drawn to scale.

Figure 1:
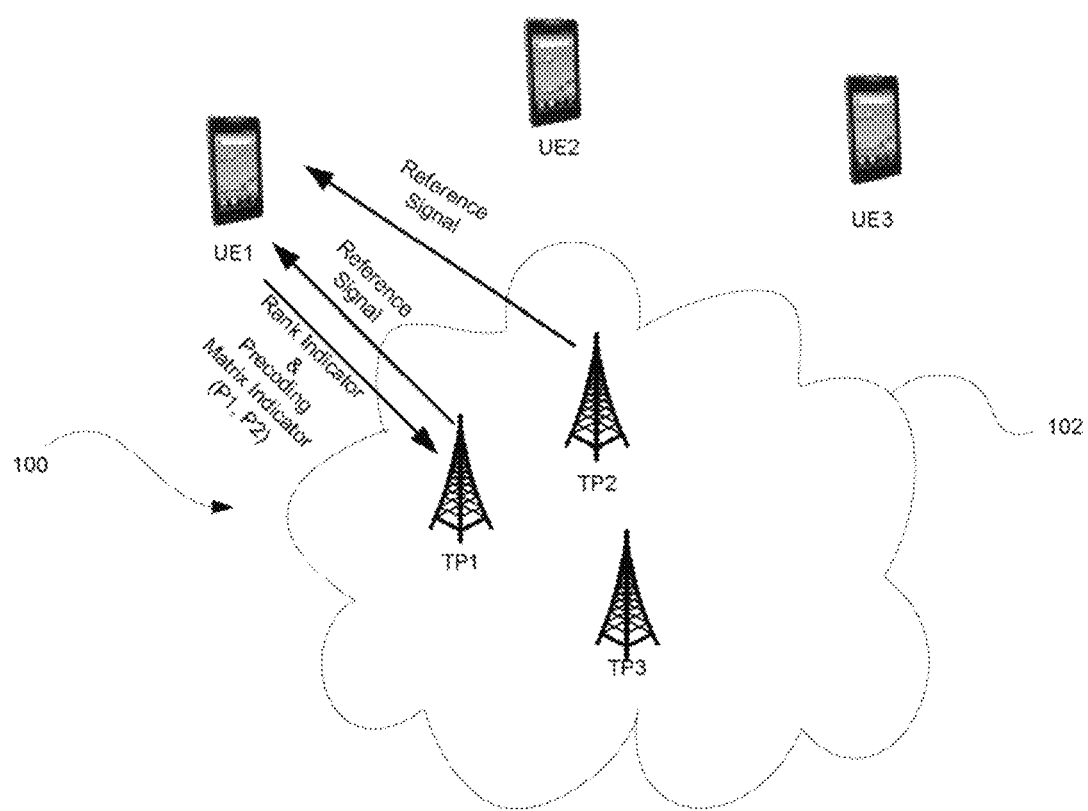
FIG. 1 is an example illustration of a communication system according to a possible embodiment.

Embodiments of the invention described include a feedback mechanism for a wireless network (e.g., an LTE cellular network) in which a wireless device (e.g., an LTE UE) transmits downlink interference data to a first transmission point (TP) (e.g., an LTE eNB that serves the UE). The wireless device generates this information by listening to reference signals (e.g., channel state information reference signals (CSI-RS)) received from the first TP as well as from a second TP (e.g., an eNB that is interfering with the signals from the serving eNB). The wireless device uses these reference signals to estimate a first channel matrix relating to the first TP (e.g., a channel response matrix H11 relating to the signals passing between the UE antennas and the eNB antennas) and a second channel matrix relating to the second TP. Using the estimated first and second channel matrices, the wireless device derives pairs of precoding matrices. The wireless device attempts to choose a rank and a particular pair of precoding matrices so as to maximize the mutual information or sum rate (e.g., the sum of mutual information across different transmission layers or streams). Once it chooses the appropriate pair of precoding matrices for the appropriate rank, the wireless device transmits this information to the first TP (e.g., in the Rank Indicator (RI) and the Precoding Matrix Indicator (PMI) along with the Channel Quality Indicator (CQI) in the Channel State Information (CSI) feedback report). The network may use this information to adjust the transmissions of various TPs (e.g., an LTE network may adjust beam direction or precoding at one or more eNBs so as to maximize total network throughput or some other network utility such as proportionally fair (PF) metric, max-min rate metric, etc.). To gather the information that enables this adjustment, the network may collect data from multiple TPs in the network. There may be a centralized controller for a subset of TPs within the network (i.e., the TPs that comprise the coordination area) such coordinated transmission is possible. Coordinated transmission includes coordinated resource allocation, coordinated precoding and spatial multiplexing (including joint transmission (JT), dynamic point selection (DPS), dynamic point blanking (DPB), coordinated beamforming (CB), etc.), coordinated power control, where each of these decisions are taken in a coordinated manner with the exchange of CSI between the individual TPs in the coordination area (i.e., cells under the coordinating TPs controlled the centralized controller) and the centralized controller.

In other embodiments of the invention, a first TP (e.g., an LTE eNB) configures a wireless terminal (e.g. an LTE UE) to report channel state information feedback. The first TP receives, from the UE, information relating to a pair of precoding matrices, wherein a first precoding matrix of the pair is applicable to a second TP and represents an assumption on the desired signal transmitted from the second TP. A second precoding matrix of the pair is applicable to a third TP and represents an assumption on the interference signal from the third TP. The network controller (which may reside in the first TP, the second TP or elsewhere within the network) determines a precoding weight matrix based on the first precoding matrix and the second precoding matrix for transmission of information from the second TP. The second TP transmits encoded information bits to the wireless terminal from its antenna ports based on the precoding weight matrix.

Although the various embodiments are frequently described in the context of an LTE cellular system, it is to be understood that the scope of the invention is not limited to LTE and may be implemented in other types of wireless networks (IEEE 802.11, 802.16, etc.).

Before going into further detail regarding various embodiments of the invention, some general concepts will now be discussed. It is to be understood that the discussion of these concept is not intended to limit the scope of the invention, but rather to aid in describing certain embodiments.

The concept of "beamforming" according to an embodiment of the invention will now be introduced. Beamforming is a general signal processing technique used to control the directionality of the reception or transmission of a signal on an array of transmitters or receivers. Beamforming takes advantage of the following properties: The transmitters or receivers in the array may be physically located on a single device or may be distributed on multiple devices. Using beamforming, a device can direct the majority of its signal energy from a group of transmitters (such as radio antennas) in a particular angular direction. Similarly, a device can use beamforming so that its receivers signal from a particular angular direction. When multiple transmitters are located near one another and send out signals, an antenna gain pattern may occur where the signals combine destructively. If, however, the delay and/or phase in the signals of the various transmitters are chosen in an appropriate manner, a beneficial antenna gain pattern may be created where the signals from the various transmitters combine constructively at least at one angular direction. The receive case works the same way, except that signals are being received rather than transmitted.

The concept of "precoding" according to an embodiment of the invention will now be introduced. Precoding is based on transmit beamforming concepts with the provision of allowing multiple beams to be simultaneously transmitted in a Multiple-Input Multiple-Output (MIMO) system. For example, the LTE specification defines a set of complex-valued weighting matrices for combining the transmission layers before transmission using various antenna configurations. The set of all weighting matrices is referred to as a "codebook," and generally each element (weighting matrix) of the codebook is a precoding matrix or a precoding vector. Codebooks may be "finite" in the sense that there are a finite number of elements from which to choose. For example, codebooks in LTE have a finite number of elements (e.g., a 4 transmit antenna codebook has 16 elements where each element can be represented by 4 bits).

The concept of a "precoding matrix" according to an embodiment of the invention will now be introduced. If a transmitter (e.g., a TP) is to send S streams over N antennas to a receiver (e.g., one or more UEs), the transmitter can use a linear transformation P on s, to obtain a N×1 signal vector x in the form:

$$x=Ps,$$

wherein P is a N×S complex-valued matrix and s is the S×1 signal vector.

Each element of s corresponds to one of the S streams that the transmitter intends to transmit. An element of P is P[n,s] where P[n,s] is the element in the n-th row and s-th column of P that describes the weighting coefficient associated with the s-th stream on the n-th antenna. For example, if S=1 and N=2, P[1,1] corresponds to the weighting coefficient (or the beamforming factor) associated with the (single) stream that is being transmitted on the first antenna and P[2,1] corresponds to the weighting coefficient associated with the stream on the second antenna. P[1,1] and P[2,1] can be chosen by the transmitter so as to maximize the signal power transmitted in a certain direction of the receiver. The linear transformation P is referred to as a "precoder" or a "precoding matrix." In wireless systems that make use of transmission based on closed-loop feedback, P belongs to a finite set of precoding matrices C, also known as the codebook. In other words, P∈C in set-theoretic notation.

The concept of a dual-codebook structure for precoding according to an embodiment of the invention will now be introduced. In this structure, $P=W_1W_2$ where $W_1 \in C^{(1)}$ and $C^{(1)}$ is a first codebook; and $W_2 \in C^{(2)}$ where $C^{(1)}$ is a second codebook. The first precoding matrix $W_1$ attempts to capture the wideband spatial properties (over all subcarriers within all subbands of interest) of the channel and the second precoding matrix $W_2$ attempts to capture the subband spatial properties (relative to the chosen $W_1$) of the channel. The roles of $W_1$ and $W_2$ can be reversed (i.e. $W_1$ represents subband spatial properties and $W_2$ represents wideband spatial properties).

The concept of a "channel response matrix" according to an embodiment of the invention will now be introduced. The signal transmitted from the N antennas by a transmitter propagates through a radio channel and are received by M antennas at the receiver. Under some conditions (e.g., the channel does not have memory or there is inter-symbol interference and the channel is flat-fading), the received signal vector y of size M×1 can be written as a linear transformation of the transmitted vector:

$$y=Hx,$$

where H is a complex-valued M×N matrix also known as the channel response matrix. Each element of H is H[m,n], which is the element in the m-th row and n-th column of H, describes the channel complex gain associated with the radio link between the n-th transmit antenna and m-th receive antenna. For example, if there are M=2 receive antennas and N=1 transmit antenna, H[1,1] corresponds to the channel gain between the transmit antenna and the first receive antenna and H[2,1] corresponds to the channel gain between the transmit antenna and the second receive antenna.

The concept of an antenna port according to an embodiment of the invention will now be introduced. An "antenna port" may be a logical port that may correspond to a beam (resulting from beamforming) or may correspond to a physical antenna at a User Equipment (UE) or a Transmission Point (TP). An antenna port may be defined such that a channel over which a symbol on the antenna port is conveyed can be inferred from the effective channel over which another symbol on the same antenna port is conveyed. More generally, an antenna port can correspond to any well-defined description of a transmission from one or more of antennas. For example, it could include a beamformed transmission from a set of antennas with appropriate antenna weights being applied, where the set of antennas itself could be unknown to a UE. In some particular implementations "antenna port" can also refer to a physical antenna port at the TP. In certain cases, the beamforming or precoding applied at the TP may be transparent to the UE. In other words, the UE need not know what precoding weights are used by the TP for a particular transmission on the downlink. In this disclosure, the term "antenna" is used as a shorthand for "antenna port." Thus an "antenna" as referred to herein may, in fact, be a virtual antenna that includes multiple antennas that function as a single antenna. It may also be a single antenna.

The concept of a "layer" according to an embodiment of the invention will now be introduced. Each logical path between an antenna port and a UE will be referred as a "layer." The number of layers between an antenna port and a UE is referred to as its "Rank." Thus, a Rank 1 transmission has one layer, Rank 2 has 2 layers, and so on.

Some embodiments of the invention are described herein using matrix math concepts, which will now be briefly described. The singular value decomposition (SVD) of a matrix is a factorization of a real valued or complex-valued matrix. Formally, the singular value decomposition of an m×n real or complex matrix A is a factorization of the form $$A=U\Sigma V^*$$

where U is an m×m real or complex unitary matrix, $\Sigma$ is an m×n rectangular diagonal matrix with nonnegative real numbers on the diagonal, and V* (the conjugate transpose of V) is an n×n real or complex unitary matrix. The diagonal entries $\Sigma_{i,i}$ of $\Sigma$ are known as the singular values of A. The m columns of U and the n columns of V are called the left-singular vectors and right-singular vectors of A, respectively.

A column space may be described as follows. Let A be a complex-valued m×n matrix, with column vectors are $v_1$, $v_2$, ..., $v_n$. A linear combination of these vectors is any vector of the form $$c_1v_1+c_2v_2+\ldots+c_nv_n$$

where $c_1, c_2, \ldots, c_n$ are complex scalars. The set of all possible linear combinations of $v_1, \ldots, v_n$ is called the column space of A denoted as col(A). That is, col(A) is the span of the vectors $v_1, \ldots, v_n$.

The nullspace (or kernel) of an m×n matrix A is the set $$N(A)=\text{Null}(A)=\text{Ker}(A)=\{x \in C^n : Ax=0\},$$

where 0 denotes the zero vector with m components. The matrix equation Ax=0 is equivalent to a homogeneous system of linear equations:

$$Ax = 0 \leftrightarrow \begin{matrix} a_{11}x_1 + & a_{12}x_2 + \ldots + & a_{1n}x_n = & 0 \\ a_{21}x_1 + & a_{22}x_2 + \ldots + & a_{2n}x_n = & 0 \\ \vdots & \vdots & \vdots & \vdots \\ a_{m1}x_1 + & a_{m2}x_2 + \ldots + & a_{mn}x_n = & 0. \end{matrix}$$

Turning to the drawings, an example of a network in which an embodiment of the invention operates will now be described. FIG. 1 illustrates a communication system 100 including a network 102, TP1, TP2 and TP3 (which may be implemented as part of Enhanced Nodes B (eNBs) or of Remote Radio Heads (RRHs)), and user equipment UE1, UE2 and UE3. Various communication devices may exchange data or information through the network 102. The network 102 may be an evolved universal terrestrial radio access (E-UTRA) or other type of telecommunication network. The network 102 may be capable of using Coordinated Multipoint (CoMP) techniques. CoMP will be described in more detail below.

The TPs may be linked to one another by a series of land and wireless connections that will be generally referred to as a "backhaul network." In an embodiment, a TP may be a distributed set of servers in the network 102. In another embodiment, a TP may correspond to a set of geographically collocated or proximal physical antenna elements. Each TP provides communication services to UEs in a geographic/site area which may be sectorized in to one or regions referred to as a cell or intra-site cell. For example, a TP may serve three cells, in which each cell can be considered as having a TP.

A UE may be one of several types of devices, such as, a mobile phone (e.g., smartphone), or laptop. Each TP may have one or more transmit antennas and one or more receive antennas. Similarly, a UE may have multiple receive antennas communicating with one or more of the TPs. Each antenna port may transmit or receive signals. A multiple antenna configuration on either a TP or a UE is may support Multiple Input Multiple Output (MIMO) communication.

To send data to a UE, a TP precodes the data to be communicated onto the one or more layers, maps and transmits the resulting precoded data to one or more antenna ports. The effective channel (or beamformed channel) corresponding to a transmission layer may be estimated based on reference signals mapped to one or more antenna ports.

Figure 2:
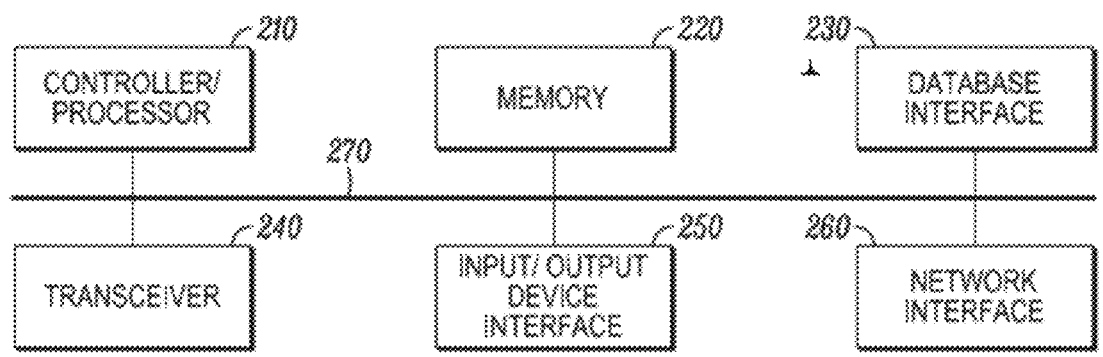
FIG. 2 is an example illustration of a configuration of a computing system to act as a TP according to a possible embodiment.

FIG. 2 illustrates a possible configuration of a computing system to act as a TP (e.g., one or more of the TPs in FIG. 1). The TP may include a processor/controller 210, a memory 220, a database interface 230, a transceiver 240, input/output (I/O) device interface 250, and a network interface 260, connected through bus 270. The TP may implement any operating system, such as Microsoft Windows®, UNIX, or LINUX, for example. Client and server software may be written in any programming language, such as C, C++, Java or Visual Basic, for example. The server software may run on an application framework, such as, for example, a Java® server or .NET® framework.

The processor/processor 210 may be any programmable processor. The subject of the disclosure may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein may be used to implement the decision support system functions of this disclosure.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM), digital video disc-read only memory (DVD-ROM), DVD read write input, tape drive, or other removable memory device that allows media content to be directly uploaded into the system. Data may be stored in the memory 220 or in a separate database. The database interface 230 may be used by the processor/controller 210 to access the database. The database may contain any formatting data to connect UE to the network 102 (FIG. 1). The transceiver 240 may create a data connection with the UE.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network 102. The network connection interface 260 may be used to connect a client device to a network. The network connection interface 260 may be used to connect the teleconference device to the network connecting the user to other users in the teleconference. The components of the TP may be connected via an electrical bus 270, for example, or linked wirelessly.

Client software and databases may be accessed by the processor/processor 210 from memory 220, and may include, for example, database applications, word processing applications, as well as components that embody the decision support functionality of the present disclosure. A TP (FIG. 1) may implement any operating system, such as Microsoft Windows®, LINUX, or UNIX, for example. Client and server software may be written in any programming language, such as C, C++, Java or Visual Basic, for example. Although not required, the disclosure is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
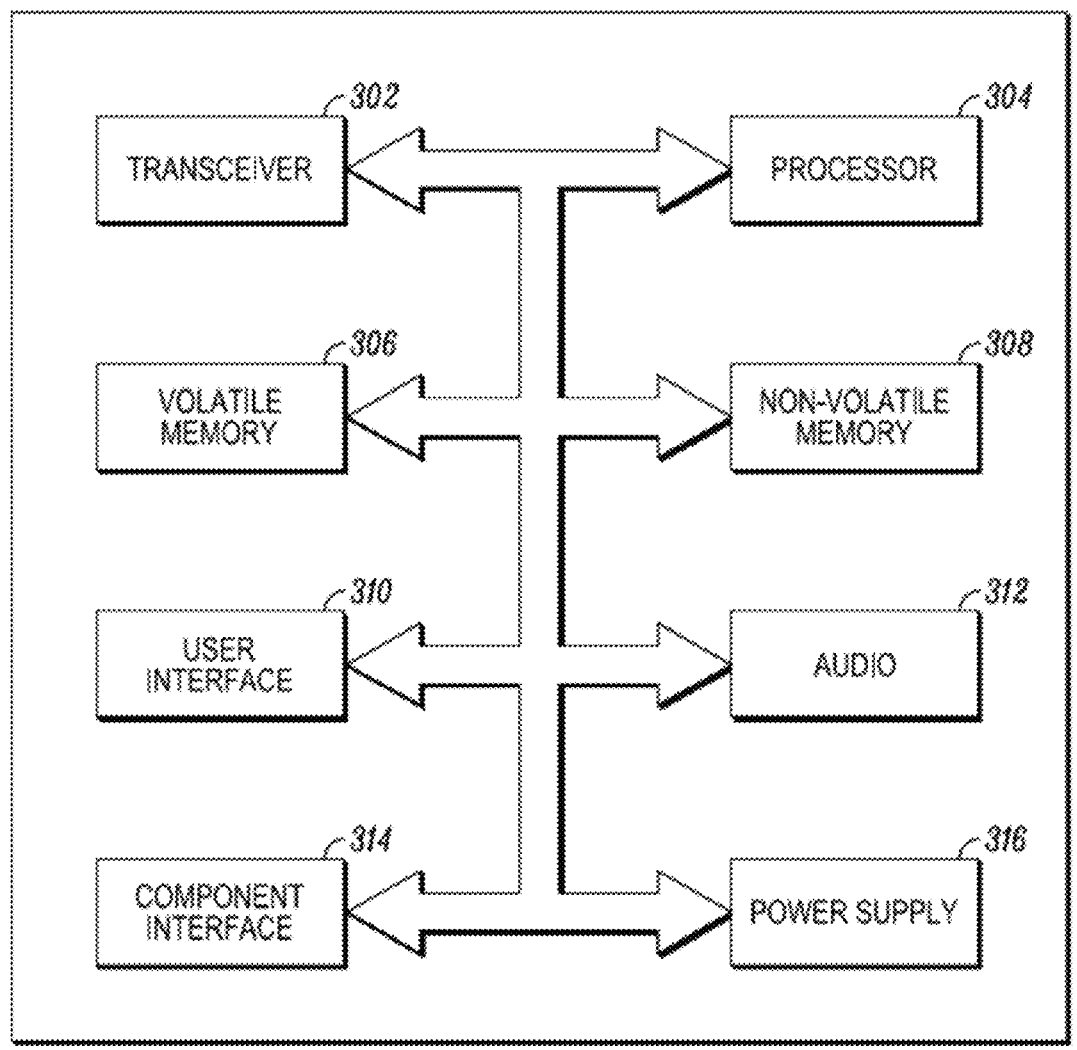
FIG. 3 is an example illustration of a user equipment block diagram according to a possible embodiment.

FIG. 3 illustrates in a block diagram one embodiment of a telecommunication apparatus or electronic device to act as a UE (such as one or more of the UEs depicted in FIG. 1). The UE may be capable of accessing the information or data stored in the network 102. For some embodiments of the disclosure, the UE may also support one or more applications for performing various communications with the network 102.

The UE may include a transceiver 302, which is capable of sending and receiving data over the network 102. The UE may include a processor 304 that executes stored programs. The UE may also include a volatile memory 306 and a non-volatile memory 308 which are used by the processor 304. The UE may include a user input interface 310 that may comprise elements such as a keypad, display, touch screen, and the like. The UE may also include a user output device that may comprise a display screen and an audio interface 312 that may comprise elements such as a microphone, earphone, and speaker. The UE also may include a component interface 314 to which additional elements may be attached, for example, a universal serial bus (USB) interface. Finally, the UE may include a power supply 316.

Referring again to FIG. 1, the general mode of communication between a TP and a UE according to an embodiment of the invention will now be described. A TP and a UE generally communicate via uplink channels and downlink channels. The physical medium used is Radio Frequency (RF) signals, which are encoded using Orthogonal Frequency-Division Multiplexing (OFDM). The modulation scheme used by the TP and the UE differs depending on whether the signals are being sent in the uplink direction (which is the UE to TP direction) or the downlink direction (which is the TP to UE direction). The modulation method used in the downlink direction is a multiple-access version of OFDM called Orthogonal Frequency-Division Multiple Access (OFDMA). In the uplink direction, Single Carrier Frequency Division Multiple Access (SC-FDMA) is used.

Figure 4:
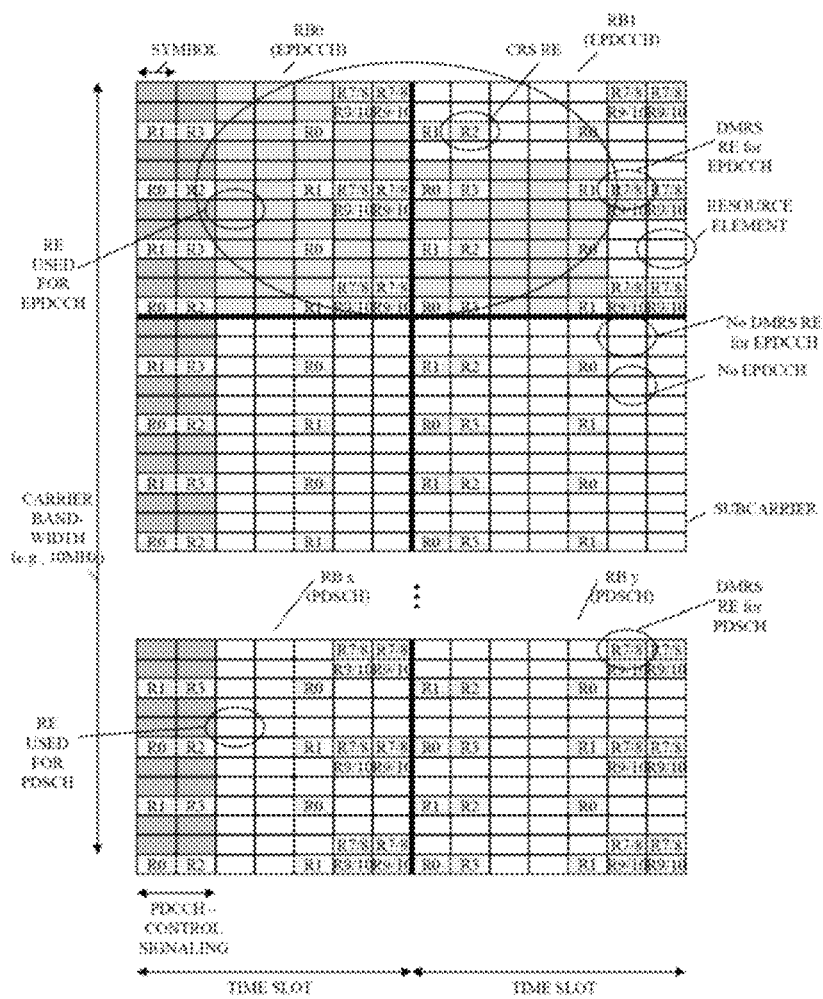
FIG. 4 shows a time-frequency diagram of an example sub-frame structure according to a possible embodiment.

The data carried by the OFDM signals in the downlink direction is organized into radio frames. Each radio frame typically includes ten subframes. FIG. 4 depicts a time-frequency diagram of a downlink subframe 400. It is to be understood that the subframe 400 shows one example subframe format, and that other formats are possible.

The vertical scale of FIG. 4 represents frequency, while the horizontal scale represents time. The vertical scale is divided into multiple blocks of frequency, or OFDM subcarriers ("subcarriers") that may be allocated for transmission. The horizontal scale of FIG. 4 is divided into multiple blocks of time, or OFDM symbols ("symbols") that may be allocated for transmission. The subframe 400 is divided into time-frequency resource blocks (RBs) (e.g., Resource Block 0 (RB0), Resource Block 1 (RB1), etc.). Each RB is twelve subcarriers by seven symbols. The subframe 400 is a total of 1.0 ms long and is divided into two time slots of 0.5 ms each. In turn, each RB can be divided into multiple resource elements (REs). Each RE is a one subcarrier by one symbol. It is to be noted that many downlink subframes may be transmitted from the TP to the UE and that various channels may occupy slots in many sub-frames.

The subframe 400 may include several types of reference signals in an embodiment of the invention. The references signals are transmitted by the TP to the UE to enable the UE to perform various functions. One such reference signals, which may be used in an LTE embodiment of the invention, will now be introduced. A Channel State Information Reference Signal (CSI-RS) is used by the UE to determine channel-state information (CSI) that the UE reports to the TP. The CSI-RS is not necessarily transmitted all subframes.

Referring again to FIG. 4, other reference signals that the subframe 400 may contain in an embodiment of the invention will now be described. REs labeled R7-R10 (and associated with antenna ports 7-10, respectively) are allocated to a Demodulation Reference Signal (DMRS) with the REs being referred to as DMRS REs. Typically, reference signals corresponding to antenna ports 7 and 8 are multiplexed using Code Division Multiplexing (CDM) or other scheme and are mapped to the same REs in time and frequency domain. The subframe can also include other reference signals such as cell-specific reference signal (CRS), positioning reference signal (PRS), primary synchronization signal (PSS) and secondary synchronization signal (SSS) that are distributed in the control regions and/or user data regions of the sub-frame. These other reference signals may be present but are not necessarily used for demodulation of received signals by a UE in an LTE-A communication system. For example, the other reference signal may include the CSI-RS, muted (or zero-power) CSI-RS where the UE can assume and zero transmission power on the reference signal REs that may be useful for interference measurements, improving channel measurements on CSI-RS from other TPs etc. The CSI-RS is typically not used for demodulation purposes and may be present in occasional sub-frames, i.e., the sub-frame periodicity, sub-frame offset (relative to a radio frame boundary), and the number of CSI-RS antenna ports are configurable via higher layer signaling. CSI-RS typically occupy REs that are not occupied by CRS, potential DMRS, etc.

The CSI that the UE reports to the TP includes a Channel Quality Indicator (CQI), a Pre-coding Matrix Indicator (PMI), a Rank Indicator (RI), and a Precoding Type Indicator (PTI). The CQI tells the TP information about the link adaptation parameters that the UE can support at that time, taking into account the transmission mode, the receiver type of the UE, the number of antennas being used by the UE and the interference being experienced by the UE. The UE reports back to the TP the highest CQI index corresponding to the MCS and TBS (Transport Block Size) for which the estimated received download transport block Block Error Rate (BLER) (e.g., the ratio of blocks sent with transmission errors to total blocks sent) does not exceed 10%. The PMI indicates to the TP the precoding matrix that the UE recommends the TP use for data transmission over multiple antennas. The RI is the recommendation of the UE to the TP for the number of transmission layers to be used in spatial multiplexing. The RI can have, for example, values of 1 or 2 with a 2-by-2 antenna configuration and from 1 to 4 with a 4-by-4 antenna configuration. The PTI distinguishes slow from fast fading environments. When the UE is configured to report PMI based on a dual-codebook, the PTI indicates whether the reported PMI corresponds to a first precoding matrix type (e.g., wideband) or a second precoding matrix type (e.g., subband).

According to an embodiment of the invention, the CSI-RS may occupy a set of time-frequency resources (e.g., a particular "pattern" of REs) of a subframe. This set of time-frequency resources will be referred to collectively as a "CSI-RS resource." A CSI-RS resource may be described by a "CSI-RS configuration." The CSI-RS configuration may include one or more of the following:

A subframe configuration, such as the identity of the subframes on which the CSI-RS is transmitted, a subframe offset (relative to a known reference point in time), and the periodicity of the subframes in which CSI-RS are transmitted;

A resource configuration, such as the OFDM symbols and corresponding REs of the subframes in which CSI-RS is transmitted; and The identity and number of antenna ports being used to transmit the CSI-RS (e.g., # of ports=4, identity of ports=15, 16, 17, and 18).

In an embodiment of the invention, the TP provides the CSI-RS configuration to the UE via RRC signaling. The RRC layer in the UE provides the CSI-RS configuration information to the physical layer in the UE (e.g., "higher layer signaling").

It is to be noted that there may be a one-to-one correspondence between each TP and each CSI-RS resource, or each CSI-RS resource may represent transmission from multiple TPs (such as when two or more TPs are involved in Joint Transmission (JT) or Dynamic Point selection (DPS)). Additionally, each CSI-RS-resource may have one or more antenna port associated with it. These possibilities hold true for the CSI-RS. There may be a one-to-one correspondence between CSI-RS and TPs, one-to-many, or one CSI-RS per antenna port.

The following is an example of a data structure that may be used for to express a CSI-RS configuration:

---
CSI-RS-Config
---

The IE CSI-RS-Config is used to specify the CSI (Channel-State Information) reference signal configuration.
CSI-RS-Config information elements
ASN1START
```
CSI-RS-Config-r10 ::=   SEQUENCE {
    csi-RS-r10          CHOICE {
      release           NULL,
      setup             SEQUENCE {
      antennaPortsCount-r10    ENUMERATED {an1, an2, an4, an8},
      resourceConfig-r10       INTEGER (0..31),
      subframeConfig-r10       INTEGER (0..154),
      p-C-r10           INTEGER (-8..15)
      }
    }                          OPTIONAL,    -- Need ON
    zeroTxPowerCSI-RS-r10   CHOICE {
      release           NULL,
      setup             SEQUENCE {
      zeroTxPowerResourceConfigList-r10    BIT STRING (SIZE (16)),
      zeroTxPowerSubframeConfig-r10    INTEGER (0..154)
      }
    }                          OPTIONAL     -- Need ON
}
ASN1STOP
```

Although the UE receives the identity of and the number of the antenna ports by which the CSI-RS is transmitted, the UE does not know which antenna port is assigned to which TP. The antenna port to TP mapping is maintained by the network.

To enable communication to occur smoothly, the TP (FIG. 1) uses control signaling, including downlink (DL) signaling via DL control channel, and uplink (UL) signaling, via UL control channel. A DL control channel may include Downlink Control Information (DCI), which may include a downlink assignment, an uplink grant, or an uplink power control command. A downlink assignment may include one of more of a downlink resource allocation information, DL Hybrid Acknowledge Repeat Request (HARQ) information, DL MIMO information, power control information, user identifier or Radio Network Temporary Indentifier (RNTI), etc. Similarly, the UL grant may include uplink resource allocation information, uplink HARQ information, uplink MIMO information, power control commands, user identifier or RNTI, etc. Some types of uplink grants are used for causing a UE to report specific control information such as channel quality information (CQI) or channel state information (CSI). Other control information that the UE may send in response to this type of uplink grant includes UE identify information, buffer occupancy information, and power control state information. A TP may request CSI information (e.g., using an uplink grant) periodically or aperiodically.

An embodiment of the invention may be carried out in a wireless network with multiple transmission points (TPs), in which two or more of the TPs coordinate to act as a single transmission point. One such coordination scheme that may be used in an LTE implementation is Coordinated Multi-Point (CoMP). CoMP allows semi-static or dynamic coordination or transmission and reception with multiple geographically separated TPs.

Figure 5:
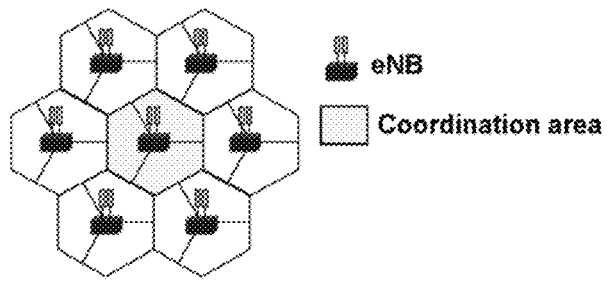
FIG. 5 shows various CoMP scenarios according to an embodiment of the invention.
Figure 5:
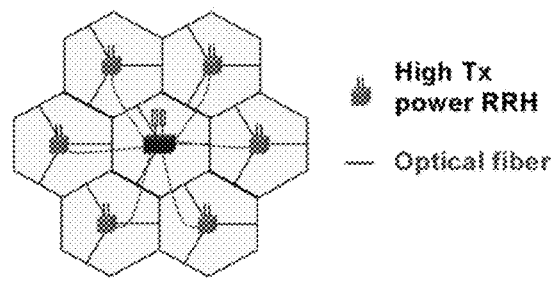
Figure 5:
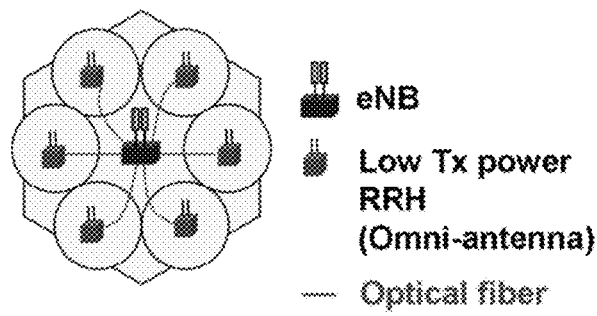

Four possible CoMP deployment scenarios will now be described with reference to FIG. 5. The first scenario is a homogeneous cellular network with intra-site CoMP. A central entity (such as the TP or an entity within the TP such as a scheduler) can control or coordinate the transmissions from the TPs of each of the three cells within its geographic area or coordination area which is referred to as intra-site CoMP. The second scenario is a homogeneous network with high transmission power Remote Radio Heads (RRHs). A RRH may be passive amplifiers, or each may contain full signal processing capability (i.e., a transceiver). RRH can also be referred to as a sub-base station, remote antenna unit, Remote Radio Unit (RRU) or other terminology known in the art. The geographic coverage area of a RRH may be sectorized in to one or cells, with each cell can be considered as having a TP. In the second scenario, the central entity can coordinate nine cells as a baseline. The designer of a system according to the second scenario may choose between 3, 19, 21 cells as a potential optional value.

The third scenario, is a heterogeneous network with low power RRHs (or low power nodes (LPN)) within the macrocell coverage. The macrocell may be an eNB intra-site cell and may be considered as being associated with a TP. The geographic coverage area of each low power RRH in the third scenario may be generally referred to as a subcell, and the RRH (with no sectorization) can be considered as being a TP. The RRHs are geographically (or spatially) separated and controlled by the TP of the macrocell. The TP can be considered as using a Distributed Antenna system (DAS) with the macrocell TP and each RRH associated with one or more antenna ports in the DAS. In this scenario, transmission/reception points created by the RRHs have different cell IDs as the macro cell. The coordination area includes 1 cell with N low-power nodes as starting point, and can include 3 intra-site cells with 3*N low-power nodes.

The fourth scenario, which is depicted in the same drawing as the third scenario, in a cellular network having low power RRHs within the macrocell coverage, similar to third scenario except the transmission/reception points created by the RRHs have the same cell IDs as the macro cell. The coordination area includes one cell with N low-power nodes as starting point and can include three intra-site cells with 3*N low-power nodes.

Although many CoMP scenarios are possible, some of the embodiments described herein are particularly directed to the second, third, and fourth CoMP deployment scenarios. The invention may be implemented in these scenarios, with the eNBs (or RRHs) that are depicted acting as TP1, TP2, etc. and one or more UEs (not shown) operating within the coverage area of one or more of the eNBs (or RRHs).

When implemented using 4G LTE, CoMP may employ a transmission scheme known as Joint Processing/Joint Transmission (JP/JT). In JP/JT, data for a UE is available at more than one point and there is coordination between multiple TPs that are geographically separated and that are simultaneously transmitting to or receiving from UEs. One type of JP/JT is Dynamic Point Selection/Dynamic Point Blanking (DPS/DPB). In DPS/DPB, certain of the transmitters are selected to transmit, while others are selected to refrain from transmitting (i.e., are selected for blanking). The transmitting/blanking point may change from one sub-frame to another including varying over the RB pairs within a sub-frame. Data is available simultaneously at multiple points. DPS may be combined with JT in which case multiple points can be selected for data transmission in the time-frequency resource.

Referring again to FIGS. 1 & 4, TPs and UEs may communicate with one another under a variety of channel conditions. The embodiments described herein are not limited to any particular set of channel conditions.

In order to illustrate the underlying concepts more clearly, it will be assumed that each channel is varying slowly enough so that the signal subspace which is $\text{col}(H_{11})$ and interference subspace which is $\text{col}(H_{12})$ predominantly remain the same from one transmission (e.g., subframe n) to the next transmission (subframe n+8), so as to allow, for example, the UE1 to send feedback to TP1 and TP2 so that TP1 and TP2 can choose appropriate precoders in a coordinated manner.

Referring again to FIG. 1, the received signal at UE1 can be written as $$y_1 = H_{11}P_1x_1 + H_{21}P_2x_2 + n_1 \qquad (1)$$

and the received signal at UE2 can be written as $$y_2 = H_{22}P_2x_2 + H_{12}P_1x_1 + n_2, \qquad (2)$$

where $H_{i,j}$ is the channel response matrix when TP i transmits and UE j receives;

$P_i$ is the precoding matrix (or vector) employed by TP I;

$n_j \sim \sigma_j CN(0, I)$ is the residual co-channel interference and noise vector at UE j.

$\sigma_j^2$ is the variance associated with the residual co-channel interference on the j-th UE.

In some embodiments of the invention, each UE employs a linear Minimum Mean Square Estimation (MMSE) receiver to recover the transmitted signal vector. For UE1, for example:

$$\hat{x}_1 = G_1 y_1, \text{ where } G_1 = P_1^* H_{11}^* (\sigma_1^2 I + H_{21}P_2P_2^*H_{21}^* + H_{11}P_1P_1^*H_{11}^*)^{-1} \qquad (3)$$

where $G_n$ is the receive filter (spatial) applied to the signal vector received at the n-th UE. There may be a similar expression for UE2.

If UE1 uses a linear MMSE filter, the filter can be equivalently written as $$G_1 = (I + P_1^* H_{11}^* R_1^{-1} H_{11} P_1)^{-1} P_1^* H_{11}^* R_1^{-1}, \text{ where} \qquad (4)$$

$$R_1 = \sigma_1^2 I + H_{21}P_2P_2^*H_{21}^*. \qquad (5)$$

If one or more of the UEs is experiencing rank-1 effective interference (i.e., rank of the effective channel matrix of the interference component $H_{21}P_2$ is 1), using the matrix inversion lemma, the following result occurs $$R_1^{-1} = \sigma_1^{-2}(I - h_{21}h_{21}^*/(\sigma_1^2 + |h_{21}|^2)) \text{ where } h_{21} \text{ is a vector such that} \qquad (6)$$

$$H_{21}P_2P_2^*H_{21}^* = h_{21}h_{21}^*. \qquad (7)$$

When the residual co-channel interference becomes negligible ($\sigma_1 \to 0$), the following is obtained:

$$G_1 = (P_1^* H_{11}^* P_{h_{21}}^\perp H_{11} P_1)^{-1} P_1^* H_{11}^* P_{h_{21}}^\perp \qquad (8)$$

where $P_{h_{21}}^\perp$ is the projection matrix into the nullspace of $h_{21}$.

Thus, Equation (8) reduces to projecting the received signal into the nullspace of $h_{21}$ (i.e. to the space orthogonal to the interference vector) followed by applying zero-forcing (ZF) in the signal space that is orthogonal to $h_{21}$. If $H_{11}P_1$ corresponds to single layer transmission, ZF is equivalent to spatial matched filtering which in this case is MRC with respect to the component of desired signal vector $H_{11}P_1$ in the space orthogonal to $h_{21}$.

Post projection operation, the received signal vector can be written as $$G_1 y_1 = x_1 + (P_1^* H_{11}^* P_{h_{21}}^\perp H_{11} P_1)^{-1} P_1^* H_{11}^* P_{h_{21}}^\perp n_1. \qquad (9)$$

Therefore, the post-MMSE SINR for layer l (Equation (9)) can be written as $$\text{SINR}_{1,k} = 1/[(P_1^* H_{11}^* P_{h_{21}}^\perp H_{11} P_1)^{-1}]_{l,l} \qquad (10)$$

The maximum number of layers that can be transmitted to UE1 from TP1 is $$v_{max} = \text{rank}(H_{11}^* P_{h_{21}}^\perp H_{11}). \qquad (11)$$

The precoding matrix that maximizes mutual information with a MMSE receiver has the form $P_1 = U(:, 1:v_{max})$, U is the unitary matrix whose first n columns correspond to the eigenvectors of $H_{11}^* P_{h_{21}}^\perp H_{11}$ corresponding to the largest n eigenvalues.

With finite alphabet codebook, RI/PMI/CQI feedback can be carried out to maximize either the sum rate (over different layers) or the predicted total throughput 1. For a hypothesis on rank (i.e. number of layers, $v = 1, \ldots, \text{rank}(P_1^* H_{11}^* P_{h_{21}}^\perp H_{11} P_1)$), the UE (e.g., UE1) finds the best precoding matrix (or vector for $v=1$), denoted as $P_1^{opt, v}$.
2. UE determines the information-theoretic mutual information (or sum rate across all layers) for v layers as $$\text{sum-rate}_v = \sum_{l=1}^{v} \log_2\left[1 / \left[\left(P_1^* H_{11}^* P_{h_{21}}^\perp H_{11} P_1\right)^{-1}\right]_{l,l}\right],$$

where $$P_1 = P_1^{opt,v}.$$

UE1 recommends the rank $v^*$ that maximizes the sum rate sum-rate$_v$ as the preferred RI and $P_1^{opt,v*}$ as the preferred PMI.

In an embodiment of the invention, in which the SNR is finite, for non-negligible residual co-channel interference, the MMSE operation (Equation 3) may not be able to be decomposed into a projection operation followed by ZF. For a finite SNR (i.e. non-negligible residual co-channel interference), projecting the received vector into the nullspace of $h_{21}$ may cause performance loss. Mean-square error (MSE) matrix is:

$$E = E(\hat{x}_1 - x_1)(\hat{x}_1 - x_1)^* = (I + P_1^* P_1^* R_1^{-1} P_1)^{-1} \qquad (12)$$

Defining:

$$\alpha_l = [(I + P_1^* R_1^{-1} P_1)^{-1}]_{l,l}, \qquad (13)$$

The SINR associated with l-th layer after MMSE filtering is given by $\text{SINR}_{1,l} = 1/\alpha_l - 1$. It can be shown that the precoder that maximizes the information-theoretic mutual information (or sum-rate across all layers)

$$\text{sum-rate} = \sum_{l=1}^{L} \log_2[1 + \text{SINR}_{1,l}]$$

has the form $P_1 = U_1[:, 1:v_1]\Sigma_1$, where $U_1$ is the unitary matrix whose first n columns are the eigenvectors of $H_{11}^* R_1^{-1} H_{11}$ corresponding to the n largest eigenvalues and $v_1$ is the transmission rank chosen by TP1 for UE1 and $\Sigma_1$ is a $v_1 \times v_1$ diagonal matrix.

The term "mutual information" used above may be conceptualized as follows: mutual information (R) is the maximum rate at which reliable communication (defined as the ability to transmit and receive k-bits of information using n-bits of coded bits so that the probability of bit error, Pe of receiving the b-bits incorrectly, tends to zero while the ratio k/n tends to a fixed limit that is less than or equal to the mutual information R. In other words, Pe→0 and k/n→r<=R) is possible. Conversely, there exists an encoding scheme which allows transmission of b-bits of information using n-bits of encoded data with vanishing error rate as long as k/n<=R.

Since $R_1 = \sigma_1^2 I + H_{21} P_2 P_2^* H_{21}^*$, a method is to choose $P_2 = U_2[:, 1:v_2]|\Sigma_2$ where $U_2$ is the unitary matrix whose first n columns are the right singular vectors of $H_{21}$ corresponding to the n smallest singular values (including zero singular values) and $v_2$ is the transmission rank chosen by TP2 for UE2 and $\Sigma_2$ is a $v_2 \times v_2$ diagonal matrix.

For codebook feedback (e.g., as in LTE Rel-10), unconstrained unitary matrices $U_1$ and $U_2$ can be determined by UE1.

The actions that a UE may take to mitigate downlink interference in one embodiment of the invention may be summarized as follows:

Step 1:
UE1 can find the "closest" codebook precoding matrix of rank $v_1$ by minimizing the subspace distance metric $$\min_{P_j \in C(v_1)}$$

$d_j$ where $$d_j = \frac{1}{2} \|P_j P_j^* - U_1[:, 1:v_1] U_1^*[:, 1:v_1]\|_F^2 \quad (13)$$

and $C(v_1)$ is the codebook of rank $v_1$. For a Rank 1 codebook, the Euclidean distance metric can be instead of the subspace distance metric. This constitutes feedback corresponding to the $P_1$ matrix.

Step 2:
In a similar manner, UE1 can determine closest codebook precoding matrix of rank $v_2$ by minimizing the subspace distance metric arg $$\min_{P_j \in C(v_2)}$$

$d_j$ where $$d_j == \frac{1}{2} \|P_j P_j^* - U_2[:, 1:v_2] U_2^*[:, 1:v_2]\|_F^2$$

and $C(v_2)$ is the codebook of rank $v_2$. This constitutes feedback corresponding to the $P_2$ matrix.

In another embodiment of the invention, instead of determining an unconstrained $U_1$, UE1 can determine $P_1 \in C(v_1)$ by selecting the precoding matrix that maximizes the sum-rate over all $v_1$ layers for a chosen $P_2$. Suppose that the criterion arg $$\min_{P_j \in C(v_2)}$$

$d_j$ in step 2 above selects the precoding matrix $P_2 \in C(v_2)$ UE1 can determine the sum rate $$\text{sum-rate} = \sum_{l=1}^{v_1} \log_2[1 + SINR_{1,l}],$$

under the assumption that TP2 is employing the precoding matrix $P_2$, for each $P_1 \in C(v_1)$. UE1 can select $P_1$ that maximizes the sum rate. This maximization can be carried out over different assumptions on the rank $v_1 = 1, 2, \ldots, N$.

According to an embodiment of the invention, UE1 can report the pair $(P_1^{(1)}, P_2^{(1)})$ to the TP. Thus, instead of TP2 muting its transmissions on some PRBs dynamically to eliminate complexity like for example in DPS/DPB, TP2 can ensure that the interference as seen by UE1 due to its transmission is quasi-orthogonal to the signal subspace of the TP1→UE1 link by signaling on the column space of $P_2^{(1)}$. It is possible that TP2 cannot effectively find a user UE2 to transmit to if UE1 recommends just one signaling matrix $P_2^{(1)}$. However, the probability that a suitable UE2 can be found may be increased if UE1 recommends more than one pair $(P_1^{(1)}, P_2^{(1)})$. For example, UE1 can send a second pair $((P_1^{(2)}, P_2^{(2)}))$, where $P_1^{(2)}$ and $P_2^{(2)}$ are respectively the second closest precoding matrices to $U_1[:, 1:v_1]$ and $U_2[:, 1:v_2]$ with respect to the subspace distance metric defined earlier. This allows TP1 and TP2 to jointly determine the precoding matrices to maximize the sum rate and also take into account other needs such as QoS, fairness, etc.

An example of how an embodiment of the invention is implemented will now be described. In this example, there is 4×2 antenna deployment where TP1 and TP2 each have 4 Tx antennas and UE1 and UE2 each have 2 Rx antennas. In this example, there is a rank restriction on the transmission to UE2 $v_2 = 1$. The TP2 to UE1 link is attenuated by 3 dB relative to TP1 to UE1 link. Similarly, the TP1 to UE2 link is attenuated by 6 dB relative to TP2 to UE2 link. In other words, both UE1 and UE2 are cell-edge users with respect to TP1 and TP2. UE1 and UE2 use the LTE Rel-10 4×1 and 4×2 codebooks which are based on Householder matrices to select PMI.

In this example, UE1 recommends rank 1 $(P_1^{(1)}, P_2^{(1)})$ matrices based on the LTE Rel-10 4×1 codebook. The TP1 signals on $P_1^{(1)}$ and TP2 signals on $P_2^{(1)}$. The sum rate for UE1 and UE2 is computed as the sum of per-UE mutual information (that is, the mutual information (for UE1 and UE2) divided by 2) assuming MMSE receivers at UE1 and UE2.

In an embodiment of the invention, channel estimation may be used to determine the elements of the channel response matrix H. For example, TP1 and TP2 may transmit a first reference signal (TP1) and a second reference signal (TP2), which the UE1 receives. The first and second reference signals are transmitted according to a periodic schedule. The schedule, which comprises the periodicity and frame, subframe, or timeslot offset of the transmission occasions of the reference signals with respect to a certain time reference (e.g., system frame number, SFN=0) is signaled to the UE semi-statically (through radio resource control (RRC) messages or system broadcast) or dynamically (through downlink control information (DCI) within the physical downlink control channel (PDCCH)). The first and the second reference signal can be one or more of a CSI-RS, a CRS, a DMRS, a dedicated reference signal (DRS) or any other reference signal. Each reference signal is characterized by a time-frequency reuse pattern that indicates which set of subcarriers within each physical resource block (PRB) of a subframe is used for transmitting the reference signal. For example, CSI-RS is transmitted from 1, 2, 4 or 8 antenna ports and each port occupies 1 out of 12 subcarriers in 1 OFDM symbol of a subframe configured for CSI-RS transmission. The serving TP (e.g., TP1) can transmit CSI-RS resource information corresponding to both TP1 and TP2 and additionally other relevant TPs.

Although, for simplicity, the above example is phrased as if a first CSI-RS maps to TP1 and a second CSI-RS maps to TP2, it is understood that a CSI-RS may originate from multiple TPs, but show up in a DL subframe as a single CSI-RS resource. As far as the UE is concerned, the exact source or sources of the CSI-RS is transparent, and may be detected as a single CSI-RS being sent over a single CSI-RS resource.

Continuing with the example, UE1 can use the CSI-RS resource configuration and receive CSI-RS transmissions from at least TP1 and TP2. Based on the received CSI-RS transmissions, UE1 can determine the individual channel matrices corresponding to the radio links between TP1→UE1 and TP2→UE1. In one embodiment, UE1 uses MMSE channel estimation approach (e.g., as in the channel estimation described above) to determine the individual entries of the channel matrix H11, which corresponds to TP1→UE1 downlink channel and also the individual entries of the channel matrix H12, which corresponds to TP2→UE1 downlink channel. In another embodiment, UE1 uses DFT-based method or least squares (LS) method to determine H11 and H12.

In another embodiment of the invention, instead of selecting a second precoding matrix $P_2$ of the pair $(P_1, P_2)$, UE1 can simply select $P_1$ after averaging the interference covariance matrix over different possible realizations of $P_2$.

As noted above, the MMSE filter at UE1 can be written as $$G_1 = (I + P_1^* H_{11}^* R_1^{-1} H_{11} P_1)^{-1} P_1^* H_{11}^* R_1^{-1},$$

where $$R_1 = \sigma_1^2 I + H_{21} P_2 P_2^* H_{21}^*.$$

Instead of computing $R_1$ based on the selected value of $P_2$, UE1 computes an expectation $R_1 = \sigma_1^2 I + E[H_{21} P_2 P_2^* H_{21}^*]$ where the expectation is over different possible realizations of $P_2$. The expectation can be computed as an in time (subframes) and/or frequency (subbands).

Continuing with another embodiment of the invention, isotropic interference emulation is generally based on assuming spatially white transmissions from the interference node(s). However, such an assumption may not be optimal for precoder selection when interference rank is less than full rank. The TP can, alternatively, query the UE1 to report PMI/RI/CQI under different interference ranks as described below:

a. If the received signal is $y_1 = H_{11} P_1 x_1 + H_{21} P_2 x_2 + n_1$, the interference covariance matrix is given by $R_1 = \sigma_1^2 I + E[H_{21} P_2 P_2^* H_{21}^*]$. assuming i.i.d. input at TP2.

b. Isotropic interference emulation (prior art) models spatially white transmission from TP2, i.e. $P_2 P_2^H = I$.

In general, $P_2 \in C$, where $$C = \bigcup_{v=1}^{N} C^{(v)}$$

and $C^{(v)}$ is the codebook of rank v. So, the interference covariance can be computed as $$R_1 = \sigma_1^2 I + (1/N|C|) \sum_{l=1}^{|C|} E[H_{21} P_l P_l^H H_{21}^H],$$

where $P_l \in C$.

$E[H_{21} P_l P_l^H H_{21}^H]$ can be computed by averaging the channel realization over the subband of interest. In other words, if $H_{21,j}$ is the channel response matrix in the j-th subcarrier of the subband and there are $J_{sc} = 12 J_{PRB}$ subcarriers in the subband comprising $J_{PRB}$ PRBs, $$E[H_{21} P_l P_l^H H_{21}^H] \approx (1/J_{sc}) \sum_{j=1}^{J_{sc}} H_{21,j} P_l P_l^H H_{21,j}^H$$

leading to $$R_1 \approx \sigma_1^2 I + (1/N J_{sc} |C|) \sum_{l=1}^{|C|} \sum_{j=1}^{J_{sc}} H_{21,j} P_l P_l^H H_{21,j}^H.$$

Given that full rank transmission (i.e., rank=N) is likely not used by the interfering nodes all the time specially at the cell edge, instead of computing the interference covariance under isotropic assumption, UE1 can assume a restricted rank interference and report the CQI/PMI/RI leading to an improved interference emulation. The TP can semi-statically configure the rank or set of ranks for TP2 the UE should assume while computing the interference covariance matrix $$R_1 = \sigma_1^2 I + (1/N|C|) \sum_{l=1}^{|C|} E[H_{21} P_l P_l^H H_{21}^H].$$

The TP can also configure a codebook subset restriction that specifies which subset of C the UE shall use for computing the interference covariance matrix.

Figure 6:
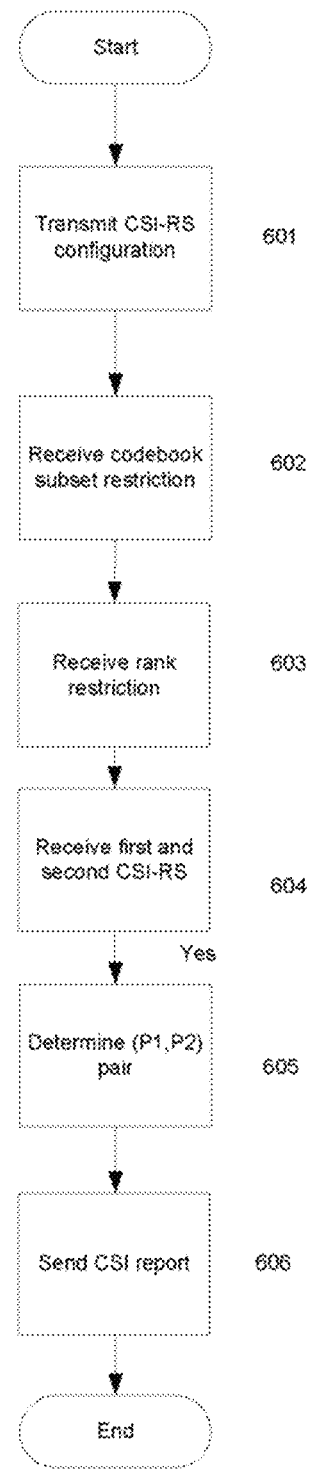
FIG. 6 is a flowchart showing a communication process according to an embodiment of the invention.

Referring back to FIG. 1 and to the flowchart of FIG. 6, an example of how a UE and a communication network may interact according to an embodiment of the invention will now be described. At step 601, TP1 transmits a CSI-RS configuration for TP2 and a CSI-RS configuration for TP2 to UE1. At step 602, UE1 receives a codebook subset restriction for CSI-RS configuration for TP2 and a codebook subset restriction for CSI-RS configuration for TP3. At step 603, UE1 receives a rank restriction for TP2 and a rank restriction for TP3. At step 604, UE1 receives a first CSI-RS from TP2 and a second CSI-RS from TP3. At step 605, UE1 determines a (P1, P2) pair subject to the codebook subset restriction and rank restriction. At step 606, UE1 sends a CSI report back to TP1 which includes information pertaining to (P1, P2).

Again, the first or second CSI-RS may be transmitted by a combination of multiple TPs, but will be perceived by UE1 as a first CSI-RS resource and a second CSI-RS resource (i.e., as a first CSI-RS and a second CSI-RS).

It can be seen from the foregoing that a novel method and apparatus for mitigating downlink control information has been described. It is to be noted that embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the present disclosure and the best modes thereof have been described in a manner establishing possession by the inventors and enabling those of ordinary skill to make and use the same, it will be understood that there are equivalents to the exemplary embodiments disclosed herein and that modifications and variations may be made thereto without departing from the scope and spirit of the disclosure, which are to be limited not by the exemplary embodiments but by the appended claims.

What is claimed is:

1. A method in a wireless terminal, the method comprising:
   estimating, by a logic circuit of the wireless terminal, a first channel matrix based on a first reference signal that corresponds to a first geographic sector including one or more transmission points;
   estimating, by the logic circuit, a second channel matrix based on a second reference signal that corresponds to a second geographic sector including one or more transmission points;
   determining, by the logic circuit, a pair of precoding matrices based on the first channel matrix and the second channel matrix, the pair of precoding matrices being selected to maximize a mutual information metric that includes a maximum rate at which reliable communication occurs between the wireless terminal and one or more transmission points wherein reliable communication includes mitigation of bit error;
   wherein a first precoding matrix of the pair is applicable to the first geographic sector and represents an assumption that a desired signal is precoded at a first transmission point by the first precoding matrix,
   wherein a second precoding matrix of the pair is applicable to the second geographic sector and represents an assumption that an interference signal is precoded at a second transmission point by the second precoding matrix, and
   sending, to at least one transmission point, a channel state information, the channel state information including information relating to the precoding matrix pair.

2. The method of claim 1, further comprising determining a second pair of precoding matrices based on the first channel matrix and the second channel matrix,
   wherein a first precoding matrix of the second pair is applicable to the first geographic sector and represents an assumption that the desired signal is precoded at the first transmission point by the first precoding matrix of the second pair,
   wherein a second precoding matrix of the second pair is applicable to the second geographic sector and represents an assumption that the interference signal is precoded at the second transmission point by the second precoding matrix of the second pair,
   wherein the channel state information includes information relating to the first and the second precoding matrix pairs.

3. The method of claim 1, wherein the first precoding matrix of the pair of precoding matrices is selected from a first codebook and the second precoding matrix of the pair of precoding matrices is selected from a second codebook.

4. The method of claim 3, further comprising:
   receiving from a first transmission point a first codebook subset restriction that indicates the subset of the first codebook from which the first precoding matrix must be determined.

5. The method of claim 3, further comprising:
   receiving from a first transmission point a second codebook subset restriction which indicates the subset of the second codebook from which the second precoding matrix must be determined.

6. The method of claim 3, further comprising:
   receiving from a first transmission point a rank restriction information which indicates the rank of a subset of precoding matrices from the second codebook from which the second precoding matrix must be determined.

7. The method of claim 1, wherein the channel state information further includes a channel quality indication that indicates a modulation scheme recommendation and a coding scheme level recommendation.

8. The method of claim 1, wherein the channel state information further includes a first precoding matrix index for the first precoding matrix and a second precoding matrix index for the second precoding matrix.

9. The method of claim 1, wherein the channel state information further includes a rank indication that indicates a rank associated with the first precoding matrix.

10. The method of claim 1, wherein the channel state information further includes a rank indication that indicates a rank associated with the second precoding matrix.

11. The method of claim 1, wherein the column space of the second of the precoding matrix pair is spanned by the right singular vectors corresponding to the lowest singular values of the second channel matrix.

12. The method of claim 1, wherein the mutual information metric includes a sum rate across different transmission layers.

13. The method of claim 1 wherein at least one of the first and second reference signals is a channel state information reference signal.

14. The method of claim 1 wherein at least one of the precoding matrices of the precoding matrix pair is a component matrix of the product form W1W2, wherein W1 belongs a first codebook of precoding matrices and W2 belongs to a second codebook of precoding matrices.

15. The method of claim 1, wherein each element of one or more of the channel matrices is the element in the m-th row and n-th column of H and describes the channel complex gain associated with a radio link between the n-th transmit antenna of at least one of the transmission points and m-th receive antenna of at least one user equipment in communication with the transmit point.

16. The method of claim 1, wherein the channel state information is transmitted on a uplink subframe periodically.

17. The method of claim 1, wherein the channel state information is transmitted on a uplink subframe aperiodically.

18. The method of claim 17, transmitting the channel state information in response to receiving a channel state information request message in a downlink control information.

19. A method in a wireless terminal, the method comprising: estimating, by a logic circuit of the wireless terminal, a first channel matrix based on a first reference signal that corresponds to a first geographic sector including one or more transmission points;
    estimating, by the logic circuit, a second channel matrix based on a second reference signal that corresponds to a second geographic sector including one or more transmission points;
    determining, by the logic circuit, an interference covariance matrix based on the second channel matrix and a precoding codebook applicable to the second geographic sector;
    determining, by the logic circuit, a precoding matrix based on the first channel matrix and the interference covariance matrix, the precoding matrix being selected to maximize a mutual information metric including a maximum rate at which reliable communication occurs between the wireless terminal and one or more transmission points wherein reliable communication includes mitigation of bit error,
    wherein the precoding matrix is applicable to the first geographic sector and represents an assumption that a signal subspace of a desired signal remains the same from a first transmission to a second transmission, and
    sending, to at least a first transmission point, a channel state information, the channel state information including information relating to the precoding matrix.

20. The method of claim 19, wherein the precoding codebook is a first precoding codebook, and the precoding matrix is selected from a second precoding codebook applicable to the first geographic sector.

21. The method of claim 19, wherein the channel state information further includes a channel quality indication that indicates a modulation scheme recommendation and a coding scheme level recommendation.

22. The method of claim 19, wherein the channel state information further includes a precoding matrix index for the precoding matrix.

23. The method of claim 19, wherein the channel state information further includes a rank indication that indicates a rank associated with the precoding matrix.

24. The method of claim 19 wherein at least one of the first and second reference signals is a channel state information reference signal.

25. The method of claim 19
    wherein the precoding codebook is a first codebook,
    wherein the precoding matrix is a matrix of the product form W1W2,
    wherein W1 belongs a second precoding codebook of precoding matrices, and
    wherein W2 belongs to a third precoding, codebook of precoding matrices.

26. The method of claim 19
    wherein the precoding codebook is a first precoding codebook,
    wherein at least one element of the first precoding codebook is a matrix of the product form W1W2,
    wherein W1 belongs a second precoding codebook of precoding matrices, and
    wherein W2 belongs to a third precoding codebook of precoding matrices.

27. The method of claim 19, wherein the channel state information is transmitted on a uplink subframe periodically.

28. The method of claim 19, wherein the channel state information is transmitted on a uplink subframe aperiodically.

29. The method of claim 28, further comprising transmitting the channel state information in response to receiving a channel state information request message in a downlink control information.

30. A method for wireless communication, the method comprising configuring, by a first transmission point within a first geographic sector, a wireless terminal to report channel state information feedback, wherein configuring is accomplished by a logic circuit of the transmission point;
    receiving, at the first transmission point, information relating to a pair of precoding matrices from the wireless terminal, wherein a first precoding matrix of the pair is applicable to a second transmission point within a second geographic sector and represents an assumption that a desired signal transmitted from the second transmission point is precoded at the second transmission point by the first precoding matrix,
    wherein a second precoding matrix of the pair is applicable to a third transmission point within a second geographic sector and represents an assumption that an interference signal from the third transmission point is precoded at the third transmission point by the second precoding matrix,
    wherein the pair of precoding matrices are estimated by the wireless terminal so as to maximize a mutual information metric including a maximum rate at which reliable communication occurs between the wireless terminal and one or more transmission points wherein reliable communication includes mitigation of bit error,
    determining, by a network controller, a precoding weight matrix based on the first precoding matrix and the second precoding matrix, and transmitting encoded information bits to the wireless terminal from the antenna ports of the second transmission point based on the precoding weight matrix.

31. The method of claim 30, further comprising receiving at least one of a first precoding matrix indicator applicable to the first precoding matrix, a second precoding matrix indictor applicable to the second precoding matrix, a rank indicator applicable to the second transmission point, a rank indicator applicable to the third transmission point, and a channel quality indication applicable to the second transmission point.

32. The method of claim 31, further comprising
periodically transmitting a reference signal from at least one of the first transmission point and the second transmission point, wherein the precoding matrices are based at least in part on the reference signal.

33. A wireless terminal that performs steps comprising:
estimating, by a logic circuit of the wireless terminal, a first channel matrix based on a first reference signal associated with a first geographic sector including one or more transmission points;
estimating, by the logic circuit, a second channel matrix based on a second reference signal associated with a second geographic sector including one or more transmission points;
determining, by the logic circuit, a pair of precoding matrices based on the first channel matrix and the second channel matrix, the pair of precoding matrices being selected to maximize a mutual information metric that includes a maximum rate at which reliable communication occurs between the wireless terminal and one or more transmission points wherein reliable communication includes mitigation of bit error,
wherein a first precoding matrix of the pair is applicable to the first geographic sector and represents an assumption that a desired signal associated with the first reference signal resource is precoded at a first transmission point by the first precoding matrix,
wherein a second precoding matrix of the pair is applicable to the second geographic sector and represents an assumption that an interference signal associated with the second geographic sector is precoded at a second transmission point by the second precoding matrix, and
sending, to one or more of the first and second transmission points, a channel state information, the channel state information including information relating to the precoding matrix pair.

* * * * *